United States Patent [19]

Foster

[11] Patent Number: 4,850,137
[45] Date of Patent: Jul. 25, 1989

[54] DEVICE FOR WATERING AND REMOVING WATER FROM CUT PLANT CONTAINERS

[76] Inventor: Charles W. Foster, 7239 Medallion Dr., Lansing, Mich. 48917

[21] Appl. No.: 624,527

[22] Filed: Jun. 25, 1984

[51] Int. Cl.⁴ ............................................. A01G 25/00
[52] U.S. Cl. ............................................ 47/79; 47/40.5
[58] Field of Search ................... 47/40.5, 48.5, 79, 82, 47/59, 62, 57.5; 784/1.5; 417/437; 141/330; 92/92; 73/294; D7/53

[56] References Cited

U.S. PATENT DOCUMENTS

| | | | |
|---|---|---|---|
| 216,808 | 6/1879 | Schrader | 47/79 |
| 1,453,401 | 5/1923 | Mattson | 47/79 |
| 2,058,934 | 10/1936 | Yoke | 47/79 |
| 2,809,468 | 10/1957 | Eliot | 47/79 |
| 2,938,304 | 5/1960 | Thomas et al. | 47/57.5 |
| 3,137,969 | 6/1964 | Sokol . | |
| 3,469,342 | 9/1969 | Morris . | |
| 3,505,760 | 4/1970 | Ambrose . | |
| 3,578,037 | 5/1971 | Flynn | 141/330 |
| 3,697,026 | 10/1972 | Hambrick . | |
| 4,112,963 | 9/1978 | Brubaker | 417/437 |

Primary Examiner—Robert A. Hafer
Attorney, Agent, or Firm—Ian C. McLeod

[57] ABSTRACT

A cut plant watering device which allows watering of the plant (101) in a container (100) and facilitates removal of the water (102) from the container (100) is described. In particular in the combined use of a suction bulb (12) funnel (11) and tube (10) in combination is described wherein the bulb is squeezed such that water replaces air in a chamber 15 inside the bulb 12, which is then separately thrown away. The cut plant (101) can be a Christmas tree.

11 Claims, 1 Drawing Sheet

U.S. Patent
Jul. 25, 1989
4,850,137
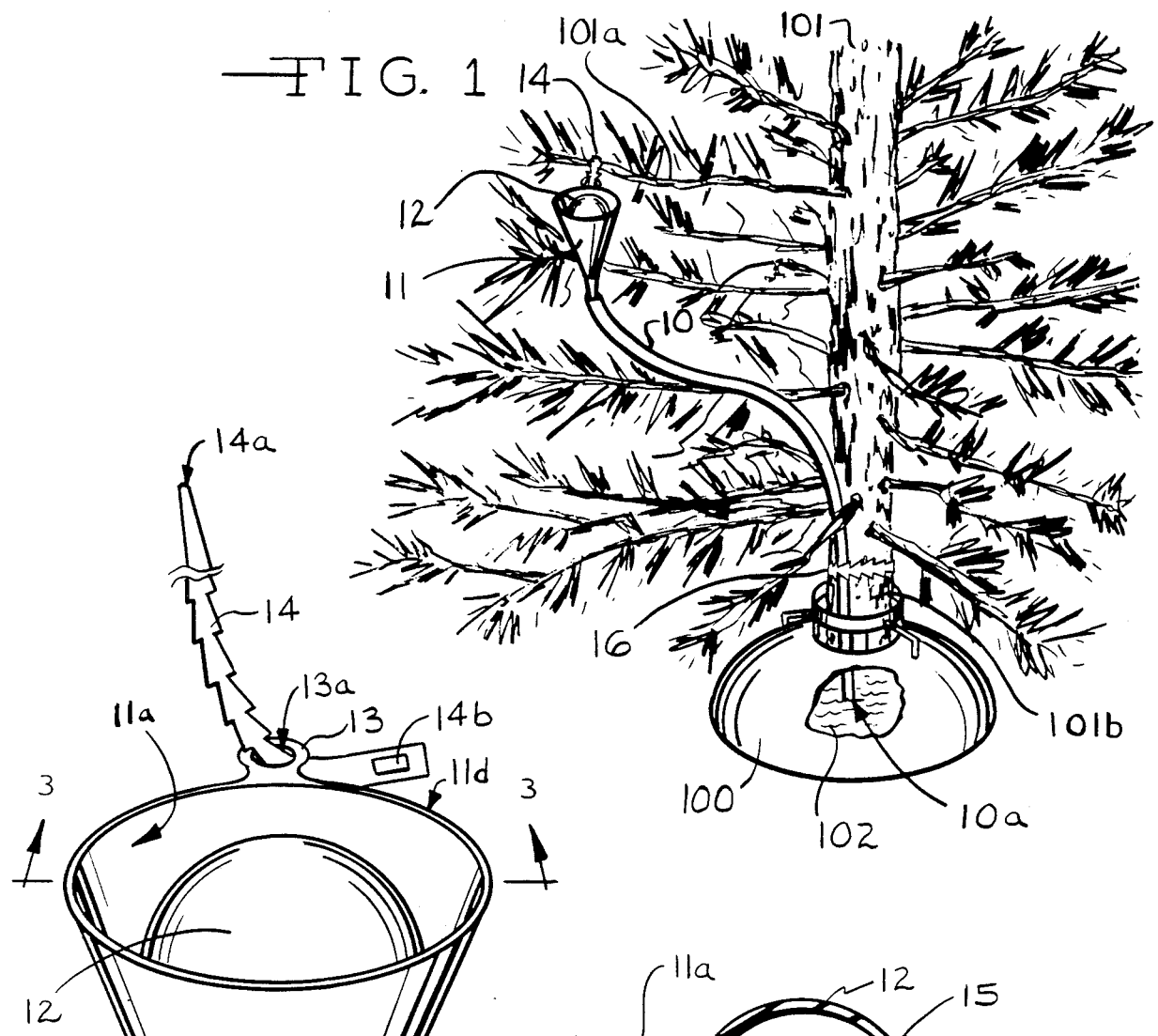
FIG. 1
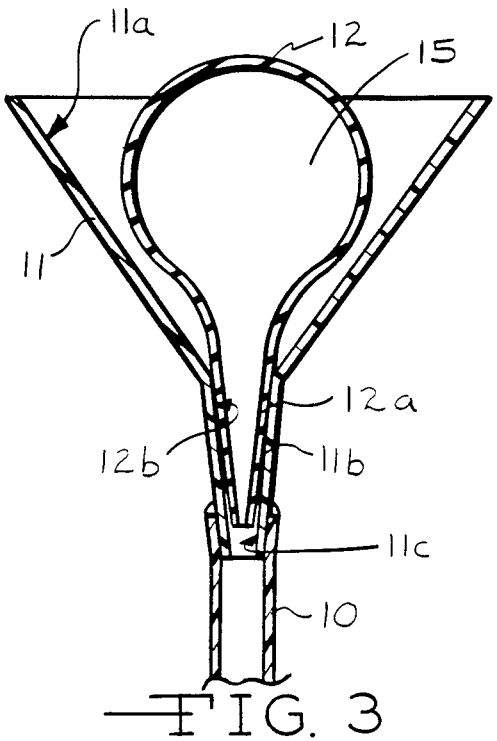
FIG. 2
FIG. 3

DEVICE FOR WATERING AND REMOVING WATER FROM CUT PLANT CONTAINERS

BACKGROUND OF THE INVENTION

The present invention relates to a cut plant (101) watering device for introducing and for removing water from a container (100) for the plant. In particular, the present invention relates to the use of a bulb (12) and funnel (11) in combination with a tube (10) for watering and removal of the water from the container.

Prior Art

The prior art has shown various cut plant watering devices. Illustrative are U.S. Pat. Nos. 3,137,969 to Sokol; 3,469,342 to Morris; 3,505,760 to Ambrose; 2,809,468 to Eliot; 2,938,304 to Thomas et al and 3,697,026 to Hambrick. Each of these devices function to water the plant by providing water in a container for the plant; however, none of the devices are adapted to remove the water from the container after the plant is to be thrown away. This is particularly a problem with Christmas trees where the water spills from the container when the tree is taken down causing preservatives, gum and sap in the water to leak onto the floor.

Objects

It is therefore an object of the present invention to provide a device which can be used both for adding and for removing water from a cut plant provided in a container. Further it is an object of the present invention to provide a device which is simple and economical to fabricate and to use. These and other objects will become increasingly apparent by reference to the following description and to the drawings.

IN THE DRAWINGS

FIG. 1 is a front perspective view of the cut plant watering device of the present invention mounted on a tree (101) with an end (10a) positioned in a container (100).

FIG. 2 is a partial front perspective view of a funnel 11 attached to a tube (10) and a bulb (12) as part of the cut plant watering device.

FIG. 3 is a front cross-sectional view of the tube (10), funnel (11), and bulb (12) along line 3—3 of FIG. 2.

GENERAL DESCRIPTION

The present invention relates to a device for watering a cut plant (101) having a cut end of a stem or trunk mounted in a container (100) for holding the water and for removal of the water from the container upon disposal of the plant which comprises:

a tube (10) with openings (10a, 10b) at either end having a length sufficient to reach into the water in the container and to allow ease of introduction of water into the container through the tube and out a first of the openings (10a);

a funnel (11) with an inside frusto-conical section (11a) and with a tubular extension (12a) from the section which is sealed (14) to the tube at a second of the openings (10b);

a flexible and elastic suction bulb (12) having a tapered elongate outer stem portion (12a) attached thereto which fits into the extension of the funnel to provide an air tight seal, wherein in use water is introduced into the funnel and through the tube and openings to the container and wherein for water removal the stem of the bulb is fitted into the extension of the funnel and compressed and released to remove the water from the container by drawing the water into the bulb through the tube. Preferably the bulb and stem are integral and made of an elastomeric material.

SPECIFIC DESCRIPTION

FIGS. 1 to 3 show the cut plant watering device of the present invention. In FIG. 1 the device is shown mounted on tree 101, such as a Christmas tree, supported by a container 100 containing water 102. The device includes a tube 10 having openings at the end of arrows for 10a and 10b. The opening 10a is positioned in the liquid 102 in the container 100. The opposite opening 10b supports a funnel 11 having a frusto-conical section 10a a tubular extension 11b having a tapered inside wall 10c. The tube 10 is sealed by a plastic adhesive 10c or a like sealing means to the extension 11b of funnel 11. A flexible and elastic suction bulb 12 is mounted essentially inside the frusto-conical section 11a of the funnel 11 with a tubular extension 12a having an outside wall 12b which seals with the inside wall 11c of the stem portion 11b of the funnel 11. The funnel 11 is provided with a ring 13 having a hole 13a integral with rim 11d. A tie strap or wire 14 (about 4 inches in length) is positioned through hole 13 and is used to attach the watering device to a limb 101a of tree 100. The end 14a of the strap 14 fits into hole 14b in a manner known to those skilled in the art. A long second tie strap 16 (about 14 inches in length) is preferably used around the trunk 101b of tree 101 to hold the tube 10 in place in the container 100.

In use the device is mounted on a tree by attaching the tie strap or wire 14 to the limb 101a and the second strap 16 to the trunk 101b of the tree. The opening 10a in tube 10 is positioned in the container 100. The bulb 12 is removed from funnel 11 and the container is filled with water to the desired level and maintained at this level over the useful life of the cut plant. When the plant is to be thrown away, the bulb 12 is compressed separately to remove air from chamber 15 and inserted into the opening 11c, compressed while sealed or compressed in the opening 11b of funnel 11 to remove the air from chamber 15 so that water is drawn through the tube 10 into the bulb 12. The tube 10 is inserted adjacent the bottom of the container 100 to provide for maximum water removal. The bulb 12 with the water in chamber 15 is removed from funnel 11 and compressed again to dispose of the water. This step is performed repeatedly until the water is essentially completely removed from the container 100. Care is taken to insure that the opening 10a in tube 10 reaches sufficiently into the container to remove most of the water 102.

It will be appreciated that various attachment means can be used to connect the funnel 11 to the limb 101a of tree 101 and the tube 10 to the trunk 101b. Also, it will be appreciated that the bulb 12 is stored in the funnel 11 when not in use and can help to prevent water evaporation through the tube 10. All of these variations will be obvious to those skilled in the art.

I claim:

1. A device for watering a cut plant (101) having a cut end of a stem or trunk mounted in a container (100) for holding the water and for removal of the water from the container upon disposal of the plant which comprises:

(a) a tube (10) with openings (10a, 10b) at either end having a length sufficient to reach into the water in the container and to allow ease of introduction of water into the container through the tube and out a first of the openings (10a);

(b) a funnel (11) with an inside frusto-conical section (11a) and with a tubular extension (12a) from the section which is sealed (14) to the tube at a second of the openings (10b);

(c) a flexible and elastic suction bulb (12) having a tapered elongate outer stem portion (12a) attached thereto which fits into the extension of the funnel to provide an air tight seal, wherein in use water is introduced into the funnel and through the tube and openings to the container and wherein for water removal the stem of the bulb is fitted into the extension of the funnel and compressed and released to remove the water from the container by drawing the water drawn into the bulb through the tube.

2. The device of claim 1 wherein the bulb and stem are integral and made of an elastomeric material.

3. The device of claim 1 wherein the extension of the funnel has an inside wall (11c) which tapers inward towards the second of the openings such that the wall provides the air tight seal with the stem portion of the bulb.

4. The device of claim 1 wherein the funnel is provided with an attachment means for attaching the funnel to a limb of a plant.

5. The device of claim 4 wherein the attachment means includes a ring (13) with a hole (13a) and a tie strap (14) through the hole for attachment to a limb of the tree.

6. The device of claim 1 wherein the bulb fits substantially inside the frusto-conical section of the funnel for storage when not in use for introducing or removing water from the container.

7. The device of claim 1 wherein an attachment means (16) are provided with the device to secure the tube to the plant adjacent the cut end.

8. The device of claim 1 wherein dual attachment means are provided to secure the funnel to a limb of the plant and to secure the tube to the plant adjacent the cut end.

9. The device of claim 1 wherein the funnel and tube are joined together by a securing means.

10. The device of claim 1 wherein the bulb and stem are integral and made of an elastic material, wherein the extension of the funnel has an inside wall (11c) which tapers inward towards the second of the openings such that the wall provides the air tight seal with the stem portion of the bulb, wherein the bulb fits substantially inside the frusto-conical section of the funnel for storage when not in use for introducing or removing water from the container, wherein dual attachment means are provided to secure the funnel to a limb of the plant and to secure the tube to the plant adjacent the cut end, and wherein the tube and funnel are joined together by a securing means.

11. The device of claim 10 adapted for a Christmas tree.

* * * * *